United States Patent
Case

(10) Patent No.: US 8,627,510 B2
(45) Date of Patent: Jan. 7, 2014

(54) ELECTRONIC DEVICE AND METHOD FOR OPERATING THE ELECTRONIC DEVICE

(75) Inventor: Christopher Wilson Case, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 989 days.

(21) Appl. No.: 12/534,225

(22) Filed: Aug. 3, 2009

(65) Prior Publication Data
US 2011/0029815 A1    Feb. 3, 2011

(51) Int. Cl.
*G06F 11/26* (2006.01)

(52) U.S. Cl.
USPC .................................................. 726/36

(58) Field of Classification Search
USPC ............................................. 726/36; 714/36
See application file for complete search history.

(56) References Cited

U.S. PATENT DOCUMENTS

| | | | | |
|---|---|---|---|---|
| 5,299,203 | A * | 3/1994 | Steele | 714/724 |
| 6,085,332 | A * | 7/2000 | El-Batal | 714/5.11 |
| 7,409,610 | B1 * | 8/2008 | Drimer | 714/725 |
| 7,724,022 | B1 * | 5/2010 | Deskin et al. | 326/8 |
| 7,966,529 | B2 * | 6/2011 | Bakhshi et al. | 714/718 |
| 8,063,650 | B2 * | 11/2011 | Ong et al. | 324/750.3 |
| 2001/0050493 | A1 * | 12/2001 | Welter | 296/97.5 |
| 2003/0217193 | A1 * | 11/2003 | Thurston et al. | 709/321 |
| 2005/0278075 | A1 * | 12/2005 | Rasmussen et al. | 700/286 |
| 2008/0278190 | A1 * | 11/2008 | Ong et al. | 324/765 |
| 2009/0206868 | A1 * | 8/2009 | Laisne et al. | 324/765 |

\* cited by examiner

*Primary Examiner* — Kambiz Zand
*Assistant Examiner* — Aubrey Wyszynski

(57) ABSTRACT

The invention describes an electronic device and a method for operating the electronic device. The electronic device includes one or more circuit components. The electronic device further includes one or more fuses and one or more non-volatile memories to disable the access of at least one of the one or more circuit components. Each of the one or more non-volatile memories includes one or more firmware, which are used to program at least one bit to manage the access of the at least one circuit component. The method includes performing a power-up sequence in a power cycle for the electronic device. The method further includes determining a state of circuit and a state of a bit for selectively enabling a test function.

22 Claims, 3 Drawing Sheets

ELECTRONIC DEVICE AND METHOD FOR OPERATING THE ELECTRONIC DEVICE

BACKGROUND

1. Field of the Invention

The present invention relates generally to the field of electronic devices, and more specifically, it relates to an electronic device and a method for operating the electronic device.

2. Description of the Related Art

Electronic devices, such as printers, scanners, copiers, multiplexers, and repeaters are usually tested for various purposes such as debugging, removing field failure, checking stability, and so forth. Testing of an electronic device may be performed by providing inputs to various components of the electronic device through external interfaces, such as ports and pins, and comparing the outputs received from the corresponding components with the desired outputs. During the testing phase, the components of the electronic device may be accessed through the external interfaces. This may expose the electronic device to the risk of being attacked by external entities, such as hackers. This may enable unauthorized users to access sensitive information stored in a memory of the electronic device, and may result in alteration of the sensitive information stored in the memory. These unauthorized users may monitor the components and features of the electronic device and may accordingly modify the functional and operational parameters of the electronic device. The monitoring of the components and features may also enable unauthorized users to reverse engineer the electronic device. Therefore, the electronic device needs to be secured once it is in production.

Various techniques are available for protecting the electronic device from attacks by external entities. In one of the techniques, fuses in the electronic device may be used to prevent access to sensitive information and internal control of the electronics device. In this technique, upon completion of the testing phase, the fuses may be blown to permanently disable external interfaces not used during normal operation. However, once the fuses are blown, the external interfaces cannot be used to access the electronic device. In another technique, bits, such as write-once bits, that can be written only once per power cycle may be used to prevent the access of the components of the electronic device. In a yet another technique, board modifications may be performed for enabling and disabling the electronic device. As can be seen, board modifications may require an unreasonable amount of time and expense to undertake.

SUMMARY OF THE INVENTION

The embodiments of the present invention overcome limitations in conventional electronic devices, thereby satisfying a need to efficiently secure various components of an electronic. In an exemplary embodiment of the present invention, the electronic device uses a combination of fuses and write-once bits to efficiently and effectively secure circuitry used in the development and debugging of the electronics device. The exemplary embodiment may include test circuitry, including a JTAG (Joint Test Action Group) port, for testing the electronics device. The electronics device may include fuse circuitry containing one or more fuses that enable the test circuitry and JTAG port prior to being blown. The electronic device may further include one or more write-once bits which enable the test circuitry and JTAG port when in a first state and disable the test circuitry and JTAG port when in a second state. The use of the fuse circuitry and the write-once bits allows for the electronic device to be tested and debugged using the test circuitry and JTAG port during development and field testing while ensuring the disablement thereof once testing is complete and the electronic device is ready for mass production.

Specifically, during development, the fuse(s) remains in the unblown state so as to enable the test circuitry and JTAG port for testing. Once the firmware is stable, the fuse(s) is blown which no longer enables the test circuitry and JTAG port. However, the write-once bit(s) may be set to a first state during a power-up sequence to be in a state which enables the test circuitry and JTAG port for further testing and/or development throughout the power cycle. Once testing and development is complete, the write-once bit(s) is written to a second state during subsequent power-up sequences which, with the fuse(s) having been blown, disables the test circuitry and JTAG port from future use.

A post-test method for operating the electronic device having such fuse circuitry and write-once bits may include performing a power-up sequence in a power cycle for the electronic device; determining, during the power-up sequence, a state of the fuse circuit in the electronic device and selectively enabling the test circuitry based upon the determined state of the fuse circuit; and determining, during the power-up sequence, a state of a write once bit in the electronic device and selectively enabling the test circuitry based upon the determined state of the bit.

BRIEF DESCRIPTION OF THE DRAWINGS

The above-mentioned and other features and advantages of this invention, and the manner of attaining them, will become more apparent and the invention will be better understood by reference to the following description of the embodiments of the invention taken in conjunction with the accompanying drawings, wherein.

DETAILED DESCRIPTION OF DRAWINGS

Figure 1:
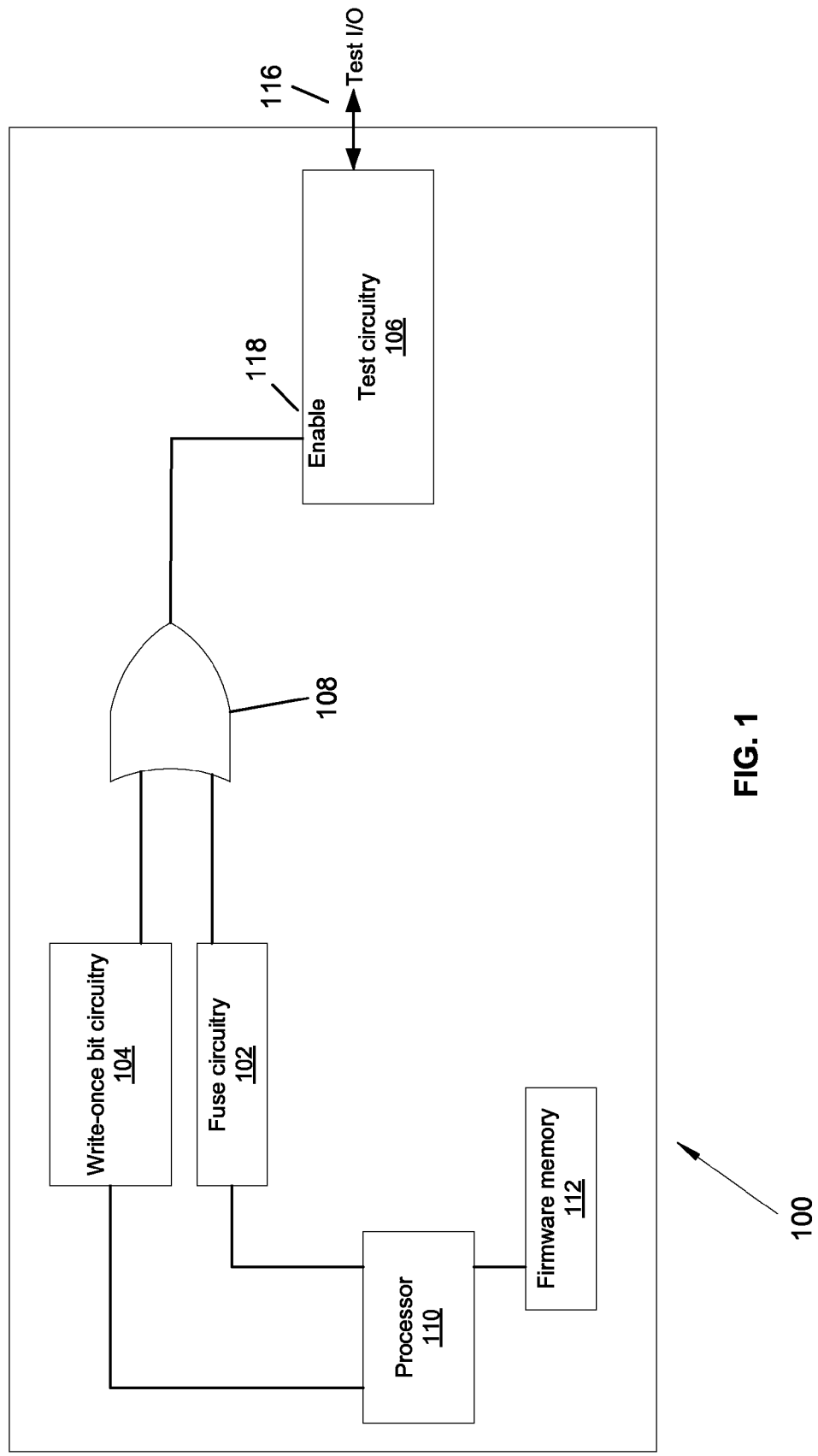
FIG. 1 is a circuit diagram illustrating an electronics device controller, in accordance with an exemplary embodiment of the invention.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments of the invention include both hardware and electronic components or modules that, for purposes of discussion, may be illustrated and described as if the majority of the components were implemented solely in hardware. However, one with ordinary skill in the art, and based on a reading of this detailed description, will recognize that, in at least one embodiment, the electronic-based aspects of the invention may be implemented in software. As such, it should be noted that a plurality of hardware- and software-based devices, as well as a plurality of different structural components may be utilized to implement the invention. Furthermore, as described in subsequent paragraphs, the specific mechanical or electronic configurations illustrated in the drawings are intended to exemplify the embodiments of the invention, and that other alternative mechanical or electronic configurations are possible.

FIG. 1 is a block diagram illustrating a device component in accordance with an exemplary embodiment of the invention. The device component may be a controller 100 for the electronics device. Controller 100 may be implemented as an Application Specific Integrated Circuit (ASIC). Alternatively, controller 100 may be a controller board within the electronics device having a controller and/or ASIC chip thereon. Controller 100 may include test circuitry 106 having a JTAG port for testing and debugging purposes. Controller 100 may further include fuse circuitry 102 having an output coupled to an enable input of test circuitry 106; write-once circuitry 104 also having an output coupled to the enable input of test circuitry 106; a processor 110 capable of executing firmware and controlling fuse circuitry 102, write-once circuitry 104 and test circuitry 106; and a firmware memory 112 coupled to processor 110. It is understood that controller 100 may include additional components and/or devices not shown in FIG. 1 or described herein, and may include additional interconnections between components and devices than that depicted in FIG. 1.

Test circuitry 106 allows for testing and debugging of controller 100 as well as other device components appearing in the electronics device. As mentioned, test circuitry 106 may include a JTAG port and corresponding circuitry for providing access to controller 100 as well as other device components using boundary scan techniques. The JTAG port includes a limited number of I/O test pins 116 for allowing access to controller 100 as is well known. Test circuitry 106 may further include an enable input 118 and associated circuitry which, when the enable input is in a first state, disables test circuitry 106 from performing any test or debug related operation and otherwise prevents access to controller 100 via test pins 116. When the enable input of test circuitry 106 is in a second state, test circuitry 106 is enabled to allow for test and debug operations to be performed using JTAG boundary scan techniques. Because JTAG techniques are well known, test circuitry 106 and its corresponding test and debug related functionality will not be described in further detail for reasons of simplicity.

It is understood that test circuitry 106 is not necessarily limited to performing JTAG related test functions and may alternatively include test and debug circuitry and functions corresponding to another standard for testing boards and ICs using boundary scan or other techniques.

Controller 100 may include the ability to securely enable test circuitry 106 when electronics device is in the development and testing stages and disable test circuitry 106 when electronics device is in mass production. Specifically, fuse circuitry 102 and write-once circuitry 104 may be used in controller 100 to control the signal provided to enable input 118 of test circuitry 106. Fuse circuitry 102 and write-once circuitry 104 may each generate a signal which is logically combined with each other using logic gate 108, the output of which drives enable input 118 of test circuitry 106. Logic gate 108 may be a logic OR gate and thereby perform a logical OR binary operation on the outputs of fuse circuitry 102 and write-once circuitry 104. In this way, either fuse circuitry 102 or write-once circuitry 104 may be utilized to enable test circuitry 106. In accordance with an exemplary embodiment of the present invention, fuse circuitry 102 and write-once circuitry 104 may be used at different times during development of the electronics device to enable test circuitry 106, as discussed in further detail below.

Fuse circuitry 102 may include one or more fuses, efuses or the like (not shown in FIG. 1). Fuses and efuses may be in an initial or unblown state in which an electrical characteristic of the fuse/efuse, such as its electrical conductivity, is at a first level, and may be programmed or blown after which the electrical characteristic of the fuse/efuse is at a different level from the first level. Circuitry in fuse circuitry 102 may sense the electrical characteristic and drive the output of fuse circuitry 102 accordingly. For instance, the output of fuse circuitry 102 may be driven to a first logic state when the fuse/efuse in fuse circuitry 102 are in the initial, unblown state, and driven to a second logic state after the fuse/efuse is blown. The state of fuse/efuse in fuse circuitry 102 may be controlled and/or programmed using processor 110, test circuitry 106 or a combination thereof. Circuits which detect the state of fuses are known in the art, so the particular structure of fuse circuitry 102 will be not be discussed for reasons of simplicity.

It is understood that other one-time-programmable components may be utilized instead of fuses or efuses in fuse circuitry 102.

Write-once circuitry 104 may include one or more write-once bits (not shown in FIG. 1). Write-once bits are bits, such as memory bits, which assume an initial state and can be programmed to be in a final state only one time during a single power cycle in which power is supplied. Write-once bits may be programmed and write-once circuitry 104 may be controlled by processor 110, test circuitry 106 or a combination thereof. Write-once bits and corresponding circuitry will not be described in further detail for reasons of simplicity.

Processor 110 may serve as the main processor for controller 100 during normal operation. In addition, processor 110 may be used to control and/or program fuse circuitry 102 and write-once circuitry 104 during development, test and debug of the electronics device. Nonvolatile memory 112 may be coupled to processor 110 and store firmware code for execution by processor 110.

Figure 2:
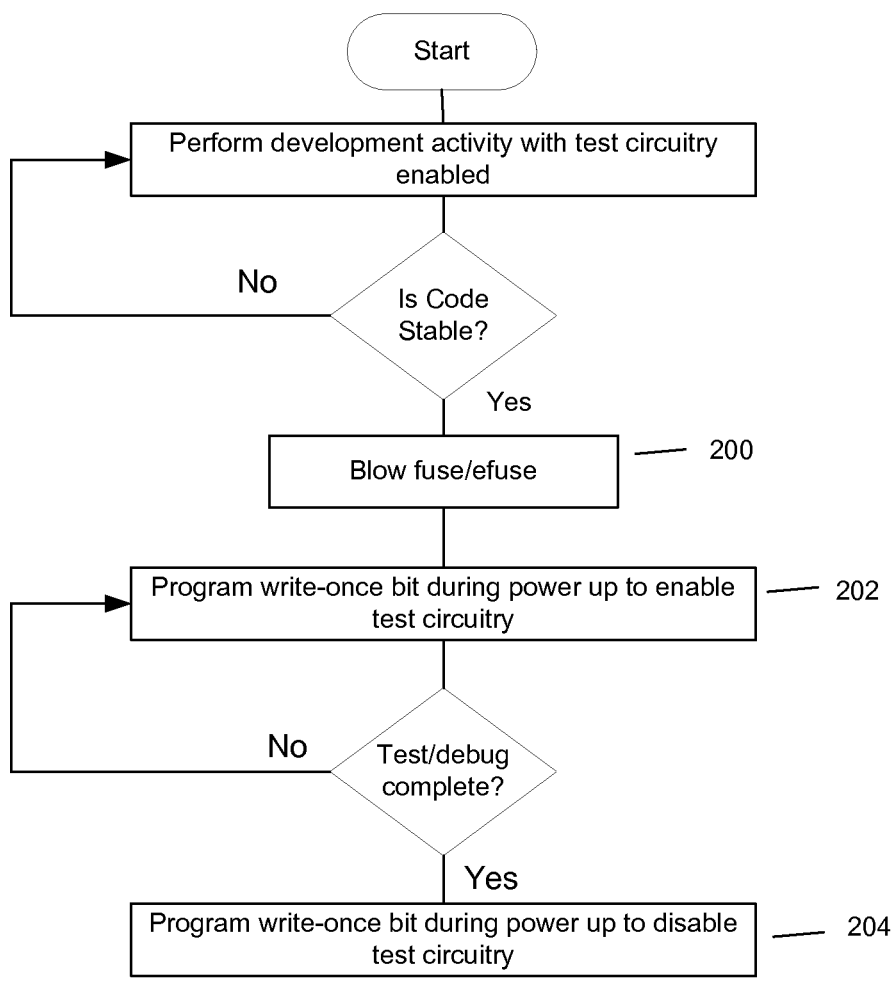
FIG. 2 depicts a flowchart illustrating an exemplary method for testing and debugging the electronic device, in accordance with an embodiment of the invention.

The operation of controller 100 according to an exemplary embodiment of the present invention will be described with respect to FIG. 2. Initially, the fuse(s)/efuse(s) in fuse circuitry 102 are not blown and the write-once bit(s) in write-once circuitry 104 may be optionally written to during a power-up and/or boot process of the electronics device so that the output of both fuse circuitry 102 and write-once circuitry 104 serve to enable test circuitry 106. Enabling test circuitry 106 allows for use of the JTAG port during, for example, firmware code development and debug activities. When the firmware code is believed to be sufficiently stable, processor 110 may control fuse circuitry 102 to blow the fuse/efuse therein at 200. The blown fuse/efuse causes the output of fuse circuitry 102 to change to a different logic state, such as a logic zero state, which no longer enables test circuitry 106. However, with the write-once bit(s) in write-once circuitry 104 being written to the appropriate state, such as a logic one state, during power-up at 202, test circuitry 106 remains enabled to allow for further test and debug activities.

Subsequently, when all testing and debug operations are complete such that test circuitry 106 is no longer needed, such as on or around the start of production of the electronics device, the write-once bit(s) in write-once circuitry 104 may be programmed at 204 by processor 110 to be written to the appropriate state, such as a logic zero state, during each power-up and/or boot process so that the bit disables test circuitry 106 from further use. Alternatively, to the extent the write-once bit(s) assumes an initial state without any programming, the initial state (logic zero) may be maintained which causes test circuitry 106 to be disabled. Thereafter, test circuitry 106 remains disabled from providing access to and/or control over controller 100.

Further, fuse circuitry 102 may include an additional fuse or efuse, and/or write-once circuitry 104 may alternatively include an additional write-once bit, which ensures that only RSA signed firmware is used, thereby guaranteeing that the firmware affecting the control of fuse circuitry 102 and write-once circuitry 104 is approved firmware. In particular, a fuse or efuse in fuse circuitry 102 may be blown in the event unapproved and/or unauthenticated firmware is loaded into memory 112 for execution by processor 110. Upon detection of the loaded firmware being unapproved, the additional fuse/efuse may be automatically blown or the additional write-once bit may be automatically written to a state which causes test enable input 118 to assume a (logic zero) state to disable test circuitry 106. In this way, unapproved firmware will be unable to gain control of test pins 116 to undesirably access or control the behavior of controller 100.

The operation of the electronics device, and particularly controller 100, during operation in normal use as a production machine will be described with respect to FIG. 3. Initially, controller 100 starts a power-up or boot process to, among other things, perform diagnostics and the like. During the power-up/boot process, a determination is made at 302 whether the fuse/efuse in fuse circuitry 102 is blown. Upon an affirmative determination that the fuse/efuse is not blown, test circuitry 106 is enabled at 308. In the event it is determined that the fuse/efuse is blown, a determination is then made at 304 whether the write-once bit(s) has been programmed to be in a first state, such as a logic zero. Upon an affirmative determination that the write-once bit(s) is not in the first state, test circuitry 106 is enabled. Otherwise, test circuitry 106 is disabled at 306. Thereafter, the power-up/boot process continues.

Figure 3:
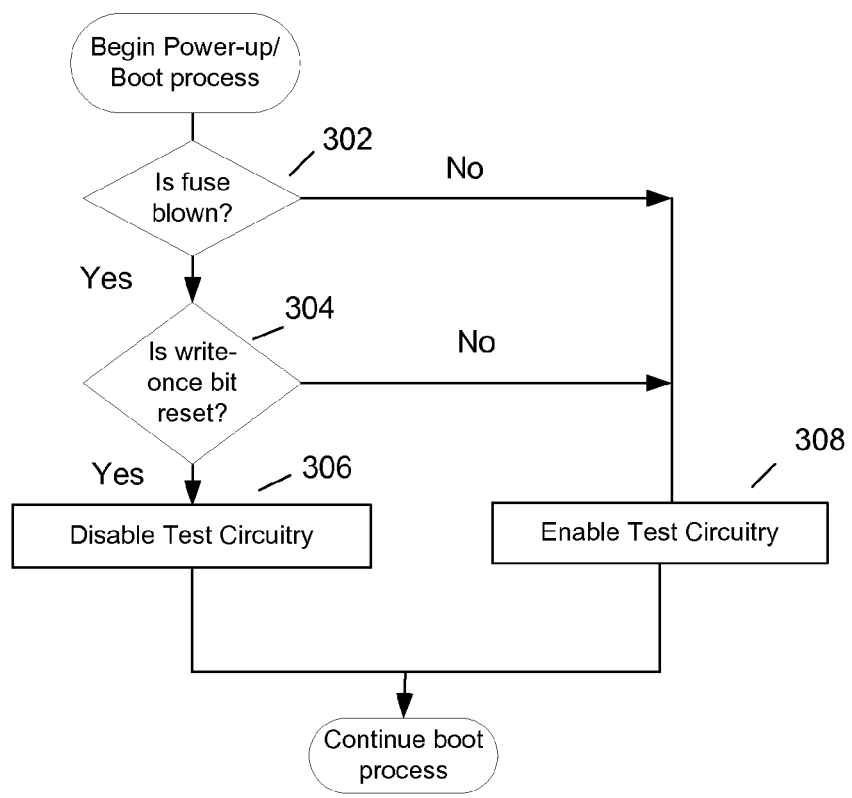
FIG. 3 is a flowchart illustrating a method of operating the electronics device in accordance with an exemplary embodiment of the invention.

It is understood that acts 302 and 304 do not necessarily occur in the sequence depicted in FIG. 3 and that other sequences (or no sequence) are contemplated.

Figure 4:
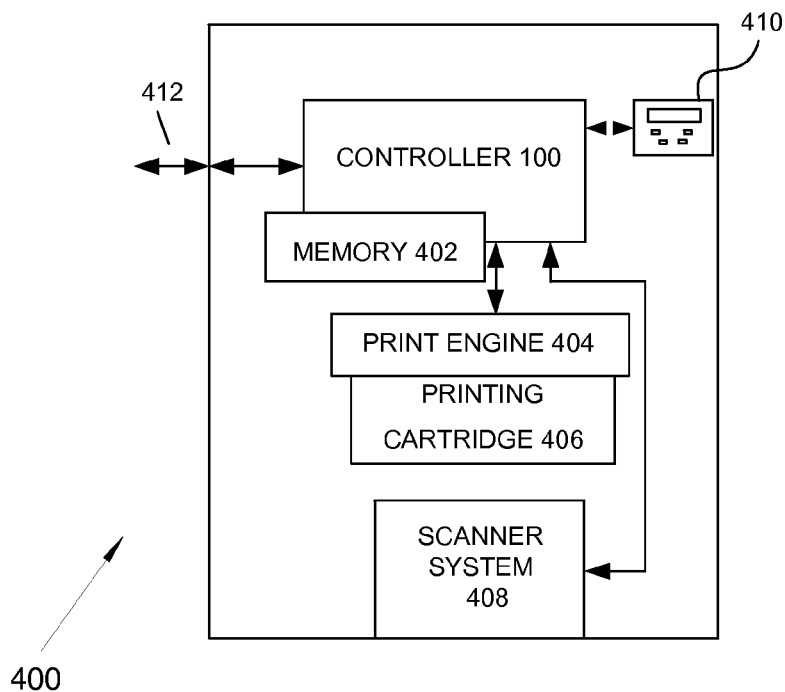
FIG. 4 is a block diagram illustrating an exemplary electronic device, in accordance with an embodiment of the invention.

It is understood that controller 100 may be utilized in a number of different electronic devices. FIG. 4 shows one electronic device, an imaging device 400, having controller 100, additional memory 402 coupled thereto; a print engine 404 controlled by or otherwise operatively coupled to controller 100; a print cartridge from which consumable material, such as ink or toner, is dispensed onto a sheet of media; a user interface 410 coupled to controller 100 for communicating with a user of imaging device 400; and a scanner system 408 for scanning an image appearing on a media sheet and generating an electronic version of such image. It is understood that imaging device 400 may include additional components, assemblies and subassemblies not shown in FIG. 4 but well known in the art. It is further understood that imaging device may not necessarily include all components and assemblies depicted in FIG. 4.

The electronic device and the method for operating the electronic device, as described above with respect to various embodiments of the present invention or any of its components, may be embodied in the form of a computer readable program code for a computer system. Typical examples of a computer system include a general-purpose computer, a programmed microprocessor, a micro-controller, a peripheral integrated circuit element, and other devices or arrangements of devices that are capable of implementing the functions and operations described above.

The foregoing description of several methods and embodiments of the invention have been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A method of operating an electronic device, comprising:
    performing a power-up sequence in each power cycle for the electronic device;
    determining, during the power-up sequence, a state of a circuit component in the electronic device and selectively enabling a function based upon the determined state of the circuit component;
    selectively programming, during the power-up sequence of each power cycle for the electronics device, a write-once bit in the electronics device, the write-once bit being programmable only once during each power cycle; and
    determining, during the power-up sequence of each power cycle for the electronics device, a state of the write-once bit in the electronic device and selectively enabling the function based upon the determined state of the bit.

2. The method of claim 1, wherein determining the state of the circuit component comprises determining whether a fuse in the circuit is blown and wherein the function is enabled if the fuse is not blown.

3. The method of claim 1, wherein the function comprises a test function including a test port, and selectively enabling the function comprises selectively enabling the test port.

4. The method of claim 3, wherein the test port is a Joint Test Action Group (JTAG) port.

5. The method of claim 1, further comprising confirming that firmware received by the electronic device is an authorized firmware, and selectively disabling the function unless enabled by the authorized firmware.

6. The method of claim 1, wherein determining the state of the write-once bit comprises determining whether the bit had changed state from an initial predetermined state, and wherein the function is enabled upon an affirmative determination that the state of the bit had changed from the initial predetermined state.

7. An electronic device comprising:
    a first circuit having at least one programmed component for disabling access to a second circuit;
    at least one write-once bit, the at least one write-once bit being programmable only once during each power cycle of the electronics device; and
    one or more non-volatile memories, each of the one or more non-volatile memories comprising firmware to selectively program the at least one write-once bit during a power up sequence of each power cycle of the electronic device to manage access to the second circuit during each power cycle.

8. The electronic device of claim 7, wherein the at least one programmed component comprises one or more fuses which when blown disables access to the second circuit based upon a state of the at least one write-once bit.

9. The electronic device of claim 7, wherein the firmware programs the at least one write-once bit to enable access to the second circuit during the power-up sequence in each power cycle.

10. The electronic device of claim 7, wherein the at least one write-once bit is programmed during the power-up sequence of each power cycle to disable access to the second circuit during each power cycle.

11. The electronic device of claim 7, wherein the second circuit comprises a test port.

12. The electronic device of claim 11, wherein the test port is a Joint Test Action Group (JTAG) port.

13. The electronic device of claim 7, wherein the firmware is an authorized firmware.

14. The electronic device of claim 7, wherein the firmware programs the at least one write-once bit during the power-up sequence of each power cycle of the electronics device, the programmed state of the at least one write-once bit disabling access to the second circuit during each power cycle.

15. The electronics device of claim 7, wherein the firmware does not program the at least one write-once bit during the power-up sequence of each power cycle of the electronics device, and an initial, unprogrammed state of the at least one write-once bit disables access to the second circuit during each power cycle.

16. A computer program product for use with a processor for operating an electronic device, the computer program product comprising a non-transitory computer usable medium having a computer readable program code embodied therein which, when executed by the processor, causes the computer readable program code to perform:

performing a power-up sequence in each power cycle for the electronic device;

determining, during the power-up sequence, a state of a circuit in the electronic device and selectively enabling a function based upon the determined state of the circuit;

selectively programming a write-once bit in the electronic device in the power-up sequence of each power cycle of the electronic device, wherein the write-once bit is programmable only one time during each power cycle of the electronics device; and determining, during each power-up sequence, a state of a write-once bit in the electronic device and selectively enabling the function based upon the determined state of the bit.

17. The computer program product of claim 16, wherein determining the state of the circuit comprises determining whether a fuse in the circuit is blown and wherein the function is enabled if the fuse is not blown.

18. The computer program product of claim 16, wherein the function includes a test port, and wherein selectively enabling the function comprises selectively enabling the test port.

19. The computer program product of claim 16, wherein the computer readable program code further performs confirming that firmware received by the electronic device is authorized firmware, and selectively disabling the function based in part upon the confirmation.

20. The computer program product of claim 16, wherein determining the state of the bit comprises determining whether the bit had changed state from an initial predetermined state, and wherein the function is enabled upon an affirmative determination that the state of the bit had changed from the initial predetermined state.

21. The computer program product of claim 16, wherein the selectively programming comprises programming the at least one write-once bit during the power-up sequence of each power cycle of the electronics device.

22. The computer program product of claim 16, wherein determining the state of the write-once bit is performed following selectively programming the write-once bit.

* * * * *